(12) United States Patent
Sun (10) Patent No.: US 12,449,148 B2
(45) Date of Patent: Oct. 21, 2025

(54) AIR PURIFICATION SYSTEM AND METHOD FOR DYNAMIC FILTERING AND STATIC STERILIZATION AND DISINFECTION OF CENTRAL AIR CONDITIONER

(71) Applicant: GUANGZHOU JP.EPE.CO., LTD., Guangzhou (CN)

(72) Inventor: Shaotang Sun, Guangzhou (CN)

(73) Assignee: GUANGZHOU JP.EPE.CO., LTD., Guangzhou (CN)

( * ) Notice: Subject to any disclaimer, the term of this patent is extended or adjusted under 35 U.S.C. 154(b) by 518 days.

(21) Appl. No.: 17/758,717

(22) PCT Filed: Dec. 8, 2020

(86) PCT No.: PCT/CN2020/134420
§ 371 (c)(1),
(2) Date: Jul. 13, 2022

(87) PCT Pub. No.: WO2021/189943
PCT Pub. Date: Sep. 30, 2021

(65) Prior Publication Data
US 2023/0031438 A1 Feb. 2, 2023

(30) Foreign Application Priority Data

Mar. 26, 2020 (CN) .......................... 202010226091.6

(51) Int. Cl.
*B01D 53/02* (2006.01)
*F24F 8/108* (2021.01)
(Continued)

(52) U.S. Cl.
CPC .............. *F24F 8/192* (2021.01); *F24F 8/108* (2021.01); *F24F 8/22* (2021.01); *F24F 11/65* (2018.01)

(58) Field of Classification Search
CPC .... F24F 11/61; F24F 11/65; F24F 8/10; F24F 8/108; F24F 8/192; F24F 8/20; F24F 8/22; F24F 8/26; Y02A 50/20
See application file for complete search history.

(56) References Cited

U.S. PATENT DOCUMENTS

| 3,766,844 A | * | 10/1973 | Donnelly | ................ F24F 3/167 454/238 |
| 5,942,017 A | | 8/1999 | Van Winkle, Sr. | |
| 2010/0135863 A1 | * | 6/2010 | Panculescu | ................ A61L 2/14 422/121 |

FOREIGN PATENT DOCUMENTS

| CN | 102589055 | 7/2012 |
| CN | 103742988 | 4/2014 |

(Continued)

OTHER PUBLICATIONS

PCT International Application No. PCT/CN20/134420, International Search Report, dated Mar. 8, 2021, 6 pages.

*Primary Examiner* — Christopher P Jones
(74) *Attorney, Agent, or Firm* — DLA Piper LLP (US)

(57) ABSTRACT

An air purification system and air purification method for the dynamic filtering and static sterilization and disinfection of a central air conditioner, the purification system comprising a first sterilization and disinfection purification device (100), a second sterilization and disinfection purification device (200) and an air circulating device. The first sterilization and disinfection purification device (100) and the second sterilization and disinfection purification device (200) respectively control, according to different operation procedures, the opening and closing of valves (101, 201) that are respectively configured. The first sterilization and disinfection purification device (100) and the second sterilization and disinfection purification device (200) each comprise a filtering unit (103), an adsorption barrier unit (104), a static (Continued)

electret unit (107), a sterilization and disinfection unit (105) and an internal air circulating unit (106). The purification system filters, purifies and sterilizes and disinfects the air, thereby improving the ventilation environment and the ecological environment.

20 Claims, 6 Drawing Sheets

(51) Int. Cl.
*F24F 8/192* (2021.01)
*F24F 8/22* (2021.01)
*F24F 11/65* (2018.01)

(56) References Cited

FOREIGN PATENT DOCUMENTS

| | | |
|---|---|---|
| CN | 103968462 | 8/2014 |
| CN | 203940531 | 11/2014 |
| CN | 107477732 | 12/2017 |
| CN | 111288588 | 6/2020 |
| CN | 111336613 | 6/2020 |
| CN | 211953088 | 11/2020 |
| CN | 212362264 | 1/2021 |

* cited by examiner

AIR PURIFICATION SYSTEM AND METHOD FOR DYNAMIC FILTERING AND STATIC STERILIZATION AND DISINFECTION OF CENTRAL AIR CONDITIONER

CROSS REFERENCE TO RELATED APPLICATION

This patent application is a national stage entry of PCT/CN2020/134420, filed Dec. 8, 2020, which claims the priority of Chinese Patent Application No. 202010226091.6 filed Mar. 26, 2020, the disclosure of which is incorporated by reference herein in its entirety as part of the present application.

TECHNICAL FIELD

The embodiment of the present disclosure relates to the field of environmental protection technology, in particular to an air purification system and method for the dynamic filtering and static sterilization and disinfection of a central air conditioner.

BACKGROUND ART

The central air conditioner is composed of one or more cold and heat source systems and a plurality of air conditioning systems. The central air conditioner has a corresponding air purification function. When the existing central air conditioner performs air purification, fresh air and return air of the system are mixed and firstly enter an air filter to filter dust particles and particles in the air. The filtered clean air enters an air processor, and exchanges heat with a cooling medium to reduce the temperature, so that the temperature of the air becomes suitable for the indoor space. The air is distributed to a required space through an air supply pipeline by an air supply fan, and is sent into a room through an air supply port of the room, so that the room maintains a certain temperature. Then, the air is exhausted and collected from the room through the return air inlet into a return air pipeline. Part of the air is exhausted into the atmospheric environment through the circulation fan by adjusting an air discharge valve, and the other part passes through the air filters of the dynamic filtration and static sterilization and disinfection device again after being mixed with supplemented fresh air through a return air adjusting valve. Part of dust particles and particles brought in the fresh air of the gas are filtered. Then, the filtered clean air enters an air conditioning processor, so that the circulation of the process is realized.

It is difficult to configure an effective air sterilization and disinfection system for the existing central air conditioning air purification system. Effective air sterilization and disinfection systems are difficult to realize dynamic sterilization and disinfection of central air conditioning systems with large-scale air handling capacity, no matter a chemical method or a physical method is used. One is the concentration of disinfection substances, or the intensity of disinfection radiation. The other is the contact (residence) time of gas in the space of the sterilization and disinfection device. For example, one of the effective chemical disinfection and sterilization methods at present is ozone process. In order to provide sufficient ozone in unit time, the power of the ozone generator should be large enough. In order to achieve effective disinfection and sterilization effect and achieve sufficient contact (residence) time, the space volume of equipment should be large enough, but large space volume is difficult to achieve in the dynamic process. In the process of dynamic sterilization and disinfection and air filtration and purification, ozone can easily enter the air circulating system, and then enters the activity space of the crowd, resulting in adverse effects on the human body.

Similarly, in order to provide sufficient ultraviolet intensity (microwave intensity) in unit time, the quantity of ultraviolet light tubes and the installed power (the power of a microwave generator) should be large enough. In order to achieve effective disinfection and sterilization effect and achieve sufficient contact (residence) time, the space volume of equipment should be large enough, but large space volume is difficult to achieve in the dynamic process. Therefore, the traditional thoughts of the existing sterilization and disinfection concepts are completely overturned, and an air purification system and method for the dynamic filtering and static sterilization and disinfection of a central air conditioner is proposed.

SUMMARY

The embodiment of the present disclosure provides an air purification system and method for the dynamic filtering and static sterilization and disinfection of a central air conditioner. The system and the method are applicable to central air conditioner purification systems of different treatment scales, overcome the disadvantages of traditional central air conditioner sterilization and disinfection devices, can effectively block bacteria and viruses from the activity space of the crowd, ensure the safety of the space, completely prevent cross infection, and at the same time, can completely kill bacteria and viruses. According to the scheme, the equipment investment of an existing system is not excessively increased, and the problems that can not be solved by the existing system are also saved, so that the system is stable in operation, safe and low in energy consumption.

In the first aspect, the embodiment of the present disclosure provides an air purification system and method for the dynamic filtering and static sterilization and disinfection of a central air conditioner. The system comprises a first sterilization and disinfection purification device, a second sterilization and disinfection purification device and an air circulating device, and the first sterilization and disinfection purification device and the second sterilization and disinfection purification device are configured in parallel, are connected with the air circulating device, and are used for filtering, sterilizing and disinfecting the air, wherein the first sterilization and disinfection purification device and the second sterilization and disinfection purification device respectively control, according to different operation procedures, the opening and closing of valves that are respectively configured, the first sterilization and disinfection purification device and the second sterilization and disinfection purification device each comprise a filtering unit, an adsorption barrier unit, a static electret unit, a sterilization and disinfection unit and an internal air circulating unit, the filtering unit is used for filtering dust and particles in the air, the adsorption barrier unit is used for adsorbing bacteria and viruses, the static electret unit is used for carrying out the static treatment on the electret air filter material forming the sub-high efficiency filter and/or the adsorption barrier unit and adding a static charge effect, the filter efficiency is promoted by using the method that the electret filter material keeps static, the sterilization and disinfection unit is used for sterilizing and disinfecting the bacteria and viruses adsorbed by the adsorption barrier unit, the air circulating device is used for realizing the air circulation of the air purification system for the dynamic filtering and static sterilization and disinfection of a central air conditioner, and the internal air circulating unit is used for respectively realizing the internal gas circulation of the first sterilization and disinfection purification device and the second sterilization and disinfection purification device during operational procedures of sterilization and disinfection.

Optionally, the system further comprises a control unit, wherein the control unit is used for controlling the opening of the valve of the first sterilization and disinfection purification device in the first preset period of time and controlling the closing of the valve of the first sterilization and disinfection purification device and the opening of the valve of the second sterilization and disinfection purification device in the second preset period of time, and the first sterilization and disinfection purification device filters the air in the first preset period of time, sterilizes and disinfects the internal filtering unit and the adsorption barrier unit in the second preset period of time, and carries out a static treatment on the electret air filter material forming the sub-high efficiency filter and/or the adsorption barrier unit in the fourth preset period of time to add a static charge effect, so that the filter efficiency is promoted.

Optionally, the filtering unit comprises a coarse efficiency filter, a medium efficiency filter and a sub-high efficiency filter which are connected in sequence, and entering gas passes through the coarse efficiency filter, the medium efficiency filter, the sub-high efficiency filter and/or the adsorption barrier unit to be filtered.

Optionally, the adsorption barrier unit and/or the sub-high efficiency filter are/is connected with the medium efficiency filter, and used for adsorbing and blocking the bacteria and viruses in the air on the surface of the adsorption barrier unit, among adsorption material particle gaps and in adsorption material micropores.

Optionally, the static electret unit is configured in front of the sub-high efficiency filter and/or the adsorption barrier unit and used for carrying out a static treatment on an electret air filter material forming the sub-high efficiency filter and/or the adsorption barrier unit and adding a static charge effect to an electret melt-blown fabric filter material forming the sub-high efficiency filter and/or the adsorption barrier unit in a timing mode. The filter efficiency is promoted with a method of maintaining static by using the electret filter material, and is maintained between 99.9% to 99.99%. Namely, the KN95 or higher standard is reached.

Optionally, the sterilization and disinfection unit comprises any one of an ultraviolet sterilization device, an ozone sterilization device and a microwave sterilization device, and is used for sterilizing and disinfecting the bacteria and viruses adsorbed and blocked on the surface of the adsorption barrier unit, among the adsorption material particle gaps and in the adsorption material micropores.

Optionally, the sterilization and disinfection unit sterilizes and disinfects the bacteria and viruses in the coarse efficiency filter, the medium efficiency filter, the sub-high efficiency filter and/or the adsorption barrier unit respectively.

Optionally, when a time threshold value is reached in the second preset period of time, the control unit controls the sterilization and disinfection unit in the first sterilization and disinfection purification device to stop sterilization and disinfection.

Optionally, the air circulating device comprises a clean air adjusting valve, a circulating and adjusting valve, an air exhaust adjusting valve, an air conditioner main unit, an air supply fan, air ducts and a circulation fan, and the air ducts comprise an air supply duct and an air return duct, wherein the first sterilization and disinfection purification device and the second sterilization and disinfection purification device supply clean air into the air conditioner main unit, the air adjusted by the air conditioner main unit is supplied into the indoor space through the air supply duct by the air supply fan, part of the gas in the indoor space is exhausted into the atmosphere through the air return duct by the circulation fan, the other part of the gas in the indoor space is supplied into the first sterilization and disinfection purification device or the second sterilization and disinfection purification device after being mixed with supplemented clean air, the air exhaust adjusting valve is used for controlling the flow of gas exhausted into the atmosphere, the circulating and adjusting valve is used for controlling the flow of circulating gas, and the clean air adjusting valve is used for adjusting the flow of the supplemented clean air.

Optionally, the internal air circulating unit is configured with internal circulation fans, and the internal circulation fans are correspondingly configured on the coarse efficiency filter, the medium efficiency filter, the sub-high efficiency filter and the adsorption barrier unit and used for realizing internal gas circulation of the first sterilization and disinfection purification device and the second sterilization and disinfection purification device during operational procedures of sterilization and disinfection.

In the second aspect, the embodiment of the present disclosure provides an air purification method for the dynamic filtering and static sterilization and disinfection of a central air conditioner, comprising the following steps:

in the first preset period of time (operational procedure of dynamic filtration purification), turning on the first sterilization and disinfection purification device to filter the air, and turning off the second sterilization and disinfection purification device;

in the second preset period of time (operational procedure of static sterilization and disinfection), turning off the first sterilization and disinfection purification device to sterilize and disinfect the internal filtering unit and the adsorption barrier unit, and turning on the second sterilization and disinfection purification device to filter the air;

when the time threshold value is reached in the second preset period of time (operational procedure of static sterilization and disinfection), stopping the sterilization and disinfection of the first sterilization and disinfection purification device to the internal air so that the first sterilization and disinfection purification device is in a standby state;

In the third preset period of time (the first sterilization and disinfection purification device carries out dynamic filtration purification, and the second sterilization and disinfection purification device begins the operational procedure of static sterilization and disinfection), turning off the filtration purification procedure of the second sterilization and disinfection purification device, and sterilizing and disinfecting the internal filtering unit and the adsorption barrier unit; and     in the fourth preset period of time (which can coincide with the first preset period of time, the second preset period of time and the third preset period of time), turning on the static electret device, carrying out a static treatment on the electret air filter material forming the sub-high efficiency filter and/or the adsorption barrier unit in the first sterilization and disinfection purification device or the second sterilization and disinfection purification device, and adding a static charge effect, so that the electret filter material keeps static, and the filter efficiency is promoted and guaranteed.

the first sterilization and disinfection purification device and the second sterilization and disinfection purification device each comprise a filtering unit, an adsorption barrier unit, a static electret unit, a sterilization and disinfection unit and an internal air circulating unit, the filtering unit is used for filtering dust and particles in the air, the sub-high efficiency filter and/or the adsorption barrier unit are/is used for adsorbing bacteria and viruses, the static electret unit is used for carrying out the static treatment on the electret air filter material and adding the static charge effect so that the electret air filter material keeps static and the filter efficiency is promoted and guaranteed, the sterilization and disinfection unit is used for sterilizing and disinfecting the bacteria and viruses adsorbed by the adsorption barrier unit, and the internal air circulating unit is used for respectively realizing the internal gas circulation of the first sterilization and disinfection purification device and the second sterilization and disinfection purification device during operational procedures of sterilization and disinfection.

In the scheme, two groups of circulating structures formed by the air purification system for the dynamic filtering and static sterilization and disinfection of a central air conditioner are connected in parallel, one for use and one for standby. The circulating structures are standby for each other, and comprise a filtering unit, an adsorption barrier unit and a sterilization and disinfection unit matched with the filtering unit, an adsorption barrier unit correspondingly. The filtering unit, comprising the coarse efficiency filter, the medium efficiency filter and the sub-high efficiency filter capable of filtering dust and fine dust particles and/or the adsorption barrier unit, can effectively block bacteria and viruses. The sterilization and disinfection unit has a high-efficiency killing capacity for different bacteria and viruses. The system is provided with connecting and fastening devices, circulating pipelines and accessories thereof among the three devices, a pipeline connected between the inlet and the outlet of the system, an air inlet, an air outlet and an emergency safety discharge valve. The air purification system for the dynamic filtering and static sterilization and disinfection of a central air conditioner adopts the optimal purification technology for the air containing dust, PM2.5 particle, bacteria and viruses, and limit purification is performed to meet the quality requirements of gas used for central air conditioners, so that the ultimate goals of effectively preventing the occurrence of cross infection and ensuring the safety of people in public places are realized.

DETAILED DESCRIPTION OF THE EMBODIMENTS

Exemplary description of the applicable scenarios of the scheme is as follows:

For various central air-conditioning places, no matter hotels and hotels, catering places, exhibition stadiums, conference halls, museums, airport station waiting places, office buildings, medical units such as infectious disease hospitals and places where cross-infection prevention is highly demanded, or large-crowd intensive production and living places, such as clean workshops, industrial workshops and indoor trading markets, large-scale air treatment is required in the operational process. The air in different environments contains large amounts of dust, fine dust particles, bacteria and viruses. In order to prevent cross infection of people in public assembly places caused by bacteria and viruses that may be carried in specific crowds and specific environments, the central air conditioning system of the places must be effectively sterilized and disinfected.

The scheme is systematically and specifically described.

Figure 1:
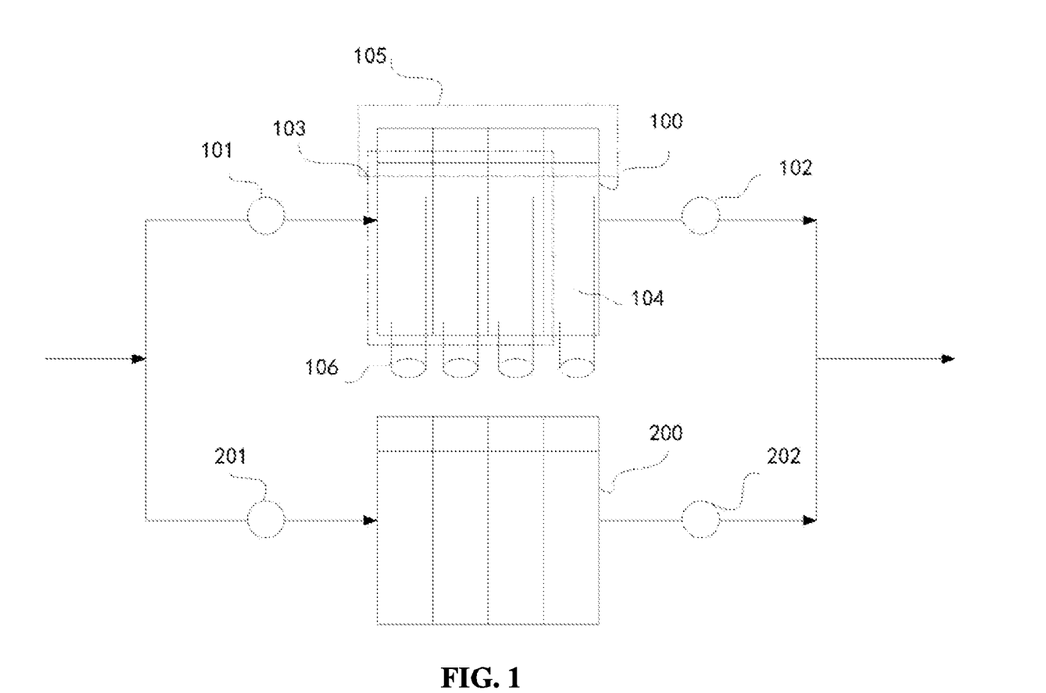
FIG. 1 is a structural connection schematic diagram of sterilization and disinfection purification devices in an air purification system for the dynamic filtering and static sterilization and disinfection of a central air conditioner provided by the embodiment of the present disclosure.

FIG. 1 is a structural connection schematic diagram of sterilization and disinfection purification devices in an air purification system for the dynamic filtering and static sterilization and disinfection of a central air conditioner provided by the embodiment of the present disclosure. As shown in FIG. 1, the air purification system for the dynamic filtering and static sterilization and disinfection of a central air conditioner comprises two sterilization and disinfection purification devices which are a first sterilization and disinfection purification device 100 and a second sterilization and disinfection purification device 200 respectively. The two sterilization and disinfection purification devices are arranged in parallel. The number of the sterilization and disinfection purification devices arranged in parallel is not limited to two. Multiple sterilization and disinfection purification devices can be arranged in parallel according to actual situations.

In one embodiment, the first sterilization and disinfection purification device 100 and the second sterilization and disinfection purification device 200 arranged in parallel perform gas flow control through valves respectively configured. The first sterilization and disinfection purification device 100 is configured with a valve 101 and a valve 102, and the second sterilization and disinfection purification device 200 is configured with a valve 201 and a valve 202. When the valve 101 and the valve 102 are opened and the valve 201 and the valve 202 are closed, air flows through the first sterilization and disinfection purification device 100. When the valve 101 and the valve 102 are closed and the valve 201 and the valve 202 are closed, air flows through the second sterilization and disinfection purification device 200.

The first sterilization and disinfection purification device 100 comprises a filtering unit 103, an adsorption barrier unit 104, a sterilization and disinfection unit 105 and an internal air circulating unit 106. The internal air circulating unit 106 is used for realizing internal gas circulation of the sterilization and disinfection purification devices, such as an internal circulation fan and connecting pipelines. The internal structure of the second sterilization and disinfection purification device 200 is the same as that of the sterilization and disinfection purification device, and is not marked in FIG. 1.

Figure 2:
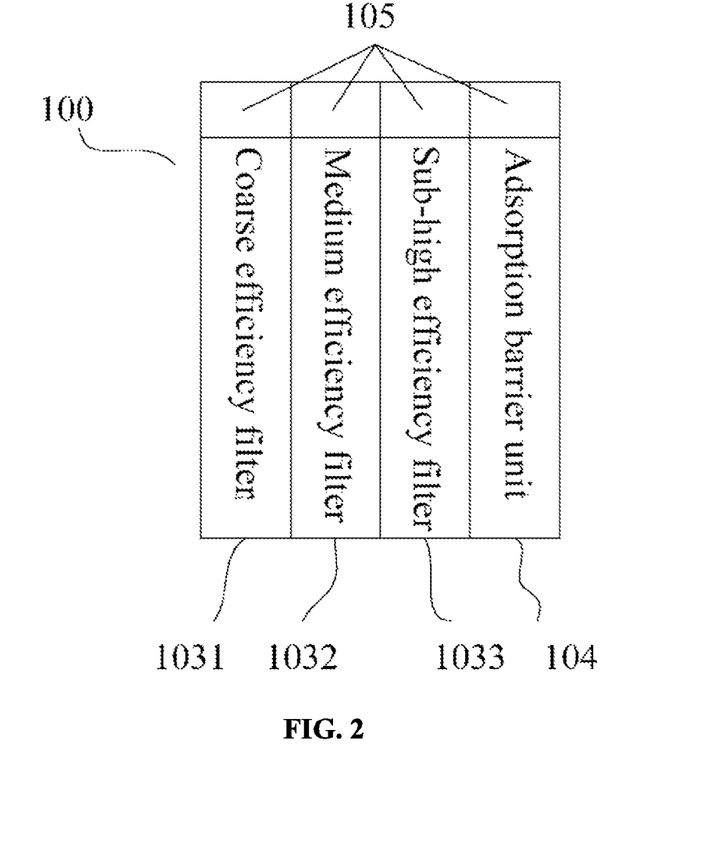
FIG. 2 is an internal structural schematic diagram of sterilization and disinfection purification devices provided by the embodiment of the present disclosure.

FIG. 2 is an internal structural schematic diagram of sterilization and disinfection purification devices provided by the embodiment of the present disclosure. Through the first sterilization and disinfection purification device 100, air can be filtered, sterilized and disinfected. The filtration treatment is performed by the filtering unit 103, wherein the filtering unit 103 comprises a coarse efficiency filter 1031, a medium efficiency filter 1032 and a sub-high efficiency filter 1033, the adsorption barrier unit 104 is used for adsorbing bacteria and viruses, and the sterilization and disinfection unit 105 is used for sterilizing and disinfecting the bacteria and viruses adsorbed by the adsorption barrier unit 104.

In one embodiment, the adsorption barrier unit and/or the sub-high efficiency filter are/is used for adsorbing and blocking the bacteria and viruses in the air on the surface of the adsorption barrier unit, among adsorption material particle gaps and in adsorption material micropores. The sterilization and disinfection unit comprises any one of an ultraviolet sterilization device, an ozone sterilization device and a microwave sterilization device, and is used for sterilizing and disinfecting the bacteria and viruses adsorbed and blocked on the surface of the adsorption barrier unit, among the adsorption material particle gaps and in the adsorption material micropores. Wherein, different sterilization and disinfection methods are used according to different usage scenarios and difference of types of bacteria and viruses, the ultraviolet sterilization device, the ozone sterilization device or the microwave sterilization device is just exemplarily explained, and other sterilization and disinfection devices can also be adopted.

In one embodiment, as shown in FIG. 2, in the first sterilization and disinfection purification device, the sterilization and disinfection units 105 are respectively configured on the coarse efficiency filter 1031, the medium efficiency filter 1032, the sub-high efficiency filter 1033 and the adsorption barrier unit 104 respectively, and disinfect the bacteria and viruses in each sub-device respectively. The separate sterilization and disinfection units respectively configured may also be combined into one total sterilization and disinfection unit to disinfect the bacteria and viruses.

Different technological types of sterilization and disinfection equipment can be selected for the sterilization and disinfection technology, and are carefully and accurately designed according to the space size of the whole air purification system for the dynamic filtering and static sterilization and disinfection of a central air conditioner, the requirements for sterilization and disinfection time as well as the technical parameters required by different technological types of sterilization and disinfection (such as the concentration of an ozone disinfectant required per unit time and unit volume, the irradiation intensity of ultra violet, the microwave power and the temperature of the whole equipment volume space), so that the purposes of achieving sterilization and disinfection effect, minimizing the operation power and reducing the operation cost are realized. According to different places, the processes such as ozone sterilization and disinfection process equipment, ultraviolet light sterilization and disinfection process and microwave sterilization and disinfection can be adopted in the present disclosure.

Figure 3:
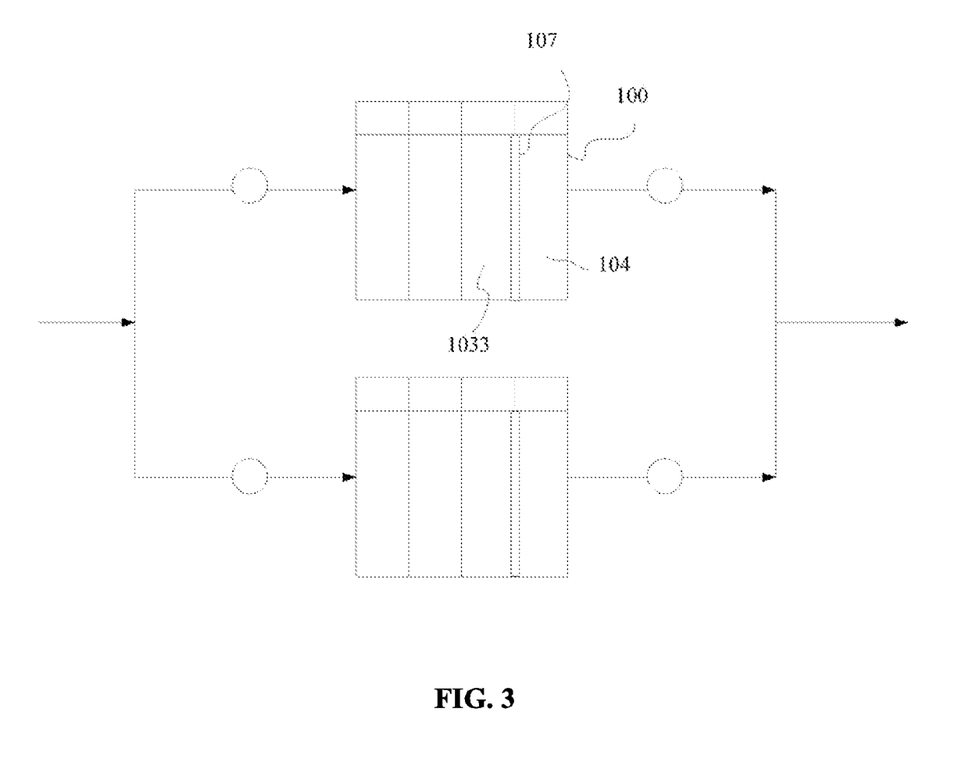
FIG. 3 is another internal structural schematic diagram of sterilization and disinfection purification devices provided by the embodiment of the present disclosure.

In one embodiment, as shown in FIG. 3, FIG. 3 is another internal structural schematic diagram of sterilization and disinfection purification devices provided by the embodiment of the present disclosure. The sterilization and disinfection purification device further comprises a static electret unit 107. The static electret unit 107 is configured between the sub-high efficiency filter 1033 and the adsorption barrier 104 and used for carrying out a static treatment on an electret air filter material forming the sub-high efficiency filter and/or the adsorption barrier unit and adding a static charge effect to an electret melt-blown fabric filter material forming the sub-high efficiency filter and/or the adsorption barrier unit in a timing mode. The filter efficiency is promoted with a method of maintaining static by using the electret filter material, and is maintained between 99.9% to 99.99%. Namely, the KN95 or higher standard is reached.

Figure 4:
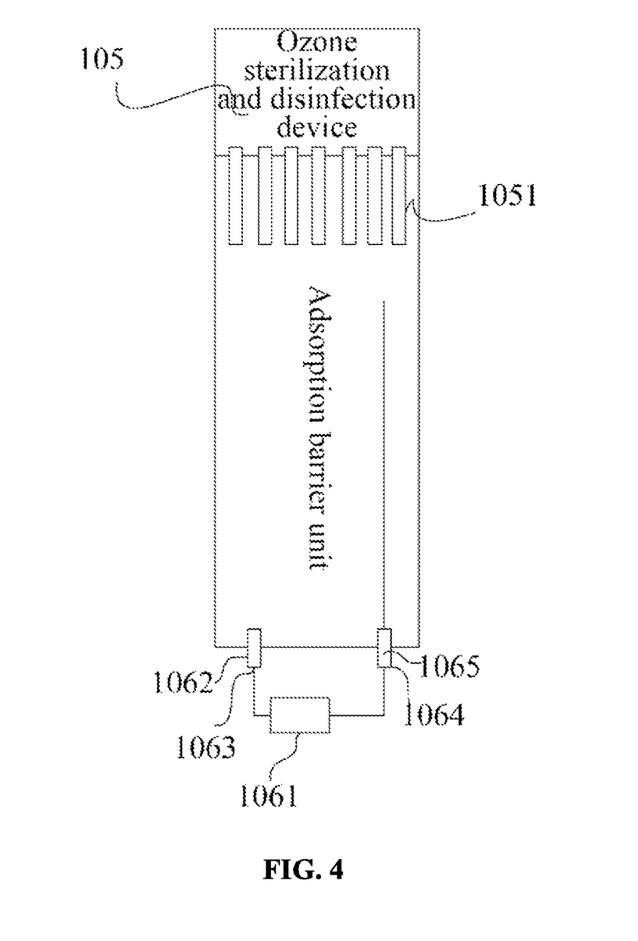
FIG. 4 is an internal structural schematic diagram of an adsorption barrier unit provided by the embodiment of the present disclosure.

FIG. 4 is an internal structural schematic diagram of an adsorption barrier unit provided by the embodiment of the present disclosure. As shown in FIG. 4, in the embodiment, the sterilization and disinfection unit 105 is composed of an ozone sterilization device. The ozone sterilization device is provided with a plurality of ozone diffusion distribution pipes 1051. The internal air circulating unit 106 comprises internal circulation fans 1061, an exhaust duct 1062, an exhaust opening 1063, an air return duct 1065 and an air return inlet 1064, and is used for realizing the internal gas circulation of the ozone sterilization device. The structure of the internal circulating unit is arranged in the filtering unit as well. Correspondingly, if the microwave sterilization device is used, microwave radiation distribution pipes are arranged; and if the ultraviolet sterilization device is used, ultraviolet pipes are arranged. The difference lies in that the ultraviolet pipes can be uniformly arranged in the internal space of the adsorption barrier unit.

Figure 5:
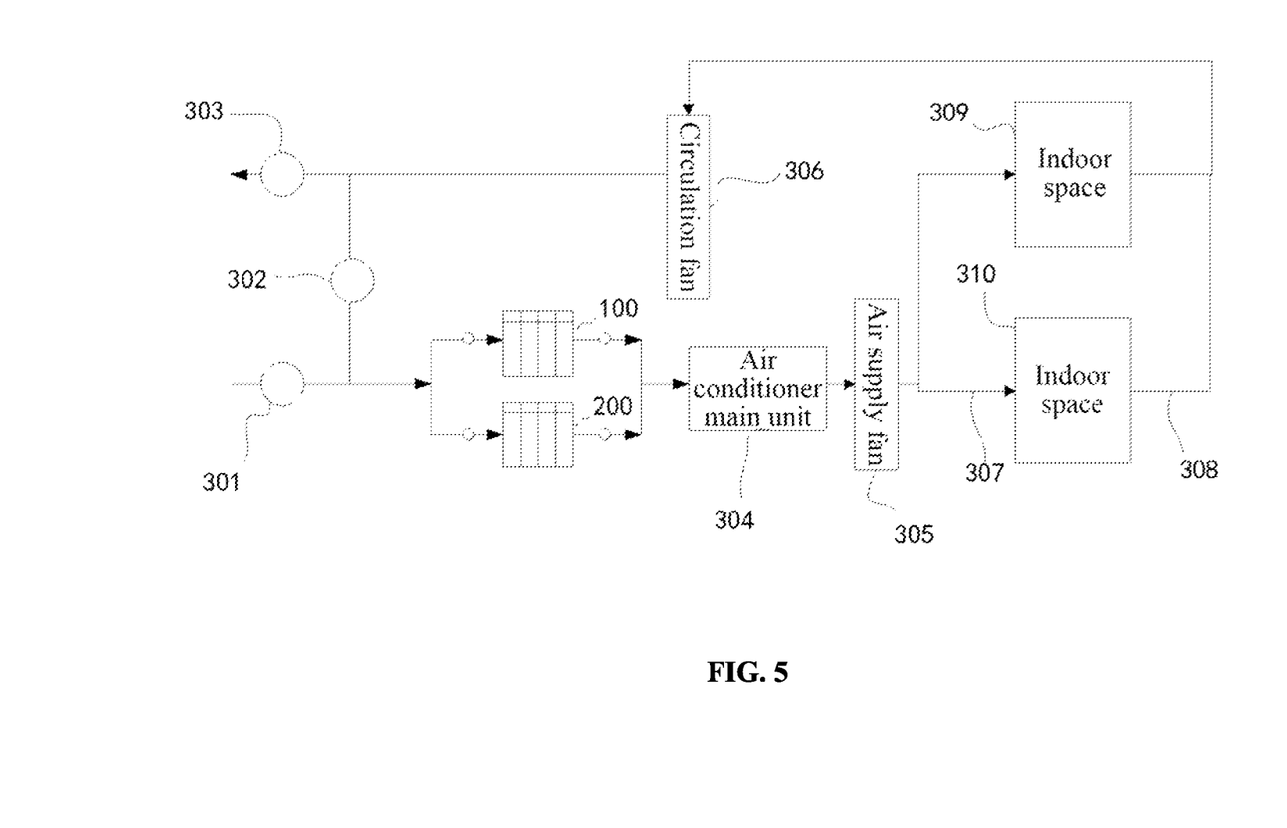
FIG. 5 is an overall structure block diagram of an air purification system for the dynamic filtering and static sterilization and disinfection of a central air conditioner provided by the embodiment of the present disclosure.

FIG. 5 is an overall structure block diagram of an air purification system for the dynamic filtering and static sterilization and disinfection of a central air conditioner provided by the embodiment of the present disclosure. As shown in FIG. 5, the system comprises a first sterilization and disinfection purification device 100, a second sterilization and disinfection purification device 200 and an air circulating device which are connected in parallel. The air circulating device comprises a clean air adjusting valve 301, a circulating and adjusting valve 302, an air exhaust adjusting valve 303, an air conditioner main unit 304, an air supply fan 305, air ducts and a circulation fan 306. The air ducts comprise an air supply duct 307 and an air return duct 308, wherein the first sterilization and disinfection purification device 100 and the second sterilization and disinfection purification device 200 supply clean air into the air conditioner main unit 304, the air adjusted by the air conditioner main unit 304 is supplied into the indoor space through the air supply duct 307 by the air supply fan 305 (two indoor spaces, namely an indoor space 309 and an indoor space 310 respectively, are included in the figure. The indoor spaces are just used for giving an example, and a plurality of indoor spaces can also be included). Part of the gas in the indoor space is exhausted into the atmosphere through the air return duct 308 by the circulation fan 306, and the other part of the gas in the indoor space is supplied into the first sterilization and disinfection purification device or the second sterilization and disinfection purification device after being mixed with supplemented clean air. The air exhaust adjusting valve 303 is used for controlling the flow of gas exhausted into the atmosphere. The circulating and adjusting valve 302 is used for controlling the flow of circulating gas. The clean air adjusting valve 301 is used for adjusting the flow of the supplemented clean air.

The air purification system for the dynamic filtering and static sterilization and disinfection of a central air conditioner provided in the scheme can realize dynamic filtration treatment and static sterilization treatment. The first sterilization and disinfection purification device and the second sterilization and disinfection purification device respectively control the opening and closing of valves that are respectively configured, and the examples are as follows.

When air treatment is required, the valve of the first sterilization and disinfection purification device is controlled to open in the first preset period of time (for example, from 7:00 a.m. to 19:00 p.m.). The control mode can be automatically controlled by a set control unit or manually controlled by a valve. At the moment, the first sterilization and disinfection purification device performs filtration treatment on the air through the internally integrated filtering unit, and the second sterilization and disinfection purification device does not operate. In the second preset period of time (for example, from 19 p.m. to 21 p.m.), the closing of the valve of the first sterilization and disinfection purification device is controlled, and the sterilization and disinfection procedure of the first sterilization and disinfection purification device is started. Meanwhile, the opening of the valve of the second sterilization and disinfection purification device is controlled. At this moment, the filtration treatment of the air is realized through the second sterilization and disinfection purification device. When a time threshold value is reached in the second preset period of time (for example, reaching 7 a.m. of the next day), the first sterilization and disinfection purification device in a standby state starts the operational procedure of filtration and adsorption purification again. At this moment, the sterilization and disinfection treatment has been completed; and therefore, the obtained air is clean air after the filtration treatment and the sterilization and disinfection treatment are completed. At the moment, the second sterilization and disinfection purification device is controlled for the sterilization and disinfection treatment. The valve is closed without air filtration treatment. In the third preset period of time (for example, from 7 a.m. to 9 a.m.), the operational procedure of sterilization and disinfection of the second sterilization and disinfection purification device is started, and thus the operation is controlled repeatedly. The preset periods of time are exemplary, and can be adjusted according to actual situations. In the scheme, the equipment after sterilization and disinfection is put into operation again. One system is configured with two sets of sterilization and disinfection devices that operate alternately and intermittently. One set is used and the other set is prepared. Instead of using the scheme of sterilization and disinfection and filtration treatment at the same time, sterilization and disinfection are not started at full time, so that the problem of high energy consumption caused by sterilization and disinfection treatment is solved, and the long-term safe and stable operation of the whole central air conditioner system under the conditions of ensuring the safety and effectively preventing cross infection is guaranteed.

In the scheme, two groups of circulating structures formed by the air purification system for the dynamic filtering and static sterilization and disinfection of a central air conditioner are connected in parallel, one for use and one for standby. The circulating structures are standby for each other, and comprise a filtering unit, an adsorption barrier unit and a sterilization and disinfection unit matched with the filtering unit, an adsorption barrier unit correspondingly. The filtering unit, comprising the coarse efficiency filter, the medium efficiency filter and the sub-high efficiency filter capable of filtering dust and particles and/or the adsorption barrier unit, can effectively block bacteria and viruses. The sterilization and disinfection unit has a high-efficiency killing capacity for different bacteria and viruses. The system is provided with connecting and fastening devices, circulating pipelines and accessories thereof among the three devices, an in-out pipeline connected between the inlet and the outlet of the system, an air inlet, an air outlet and an emergency safety discharge valve. The air purification system for the dynamic filtering and static sterilization and disinfection of a central air conditioner adopts the optimal purification technology for the air containing dust, PM2.5 particle, bacteria and viruses, and limit purification is performed to meet the quality requirements of gas used for central air conditioners, so that the ultimate goals of effectively preventing the occurrence of cross infection and ensuring the safety of people in public places are realized.

The scheme creatively proposes a brand-new governance structure for ensuring the sterilization and disinfection of the central air conditioner. Through the air purification system for the dynamic filtering and static sterilization and disinfection of a central air conditioner, the air system, required by the central air conditioner, ensuring the absolute safety of the active crowd is subject to limit purification, so that the air can be purified safely and effectively. However, the purified gas is returned to the system again, and is recycled to completely eliminate the impact on the surrounding environment, eliminate the safety concerns of people and realize the social harmony. Compared with the correlation technique, filtration purification and sterilization and disinfection of the system are effectively solved; the cross infection is completely eradicated, and the panic psychology of people is eliminated; the equipment production and the installation efficiency are improved through the modular structures; the wasted energy is recycled to the maximum extent, and the energy consumption of the system is reduced; and the system layout is optimized, the operation cost is reduced, and the ventilation environment and ecological environment are improved. The environmental benefits, the social benefits and the economic benefits complement each other.

Figure 6:
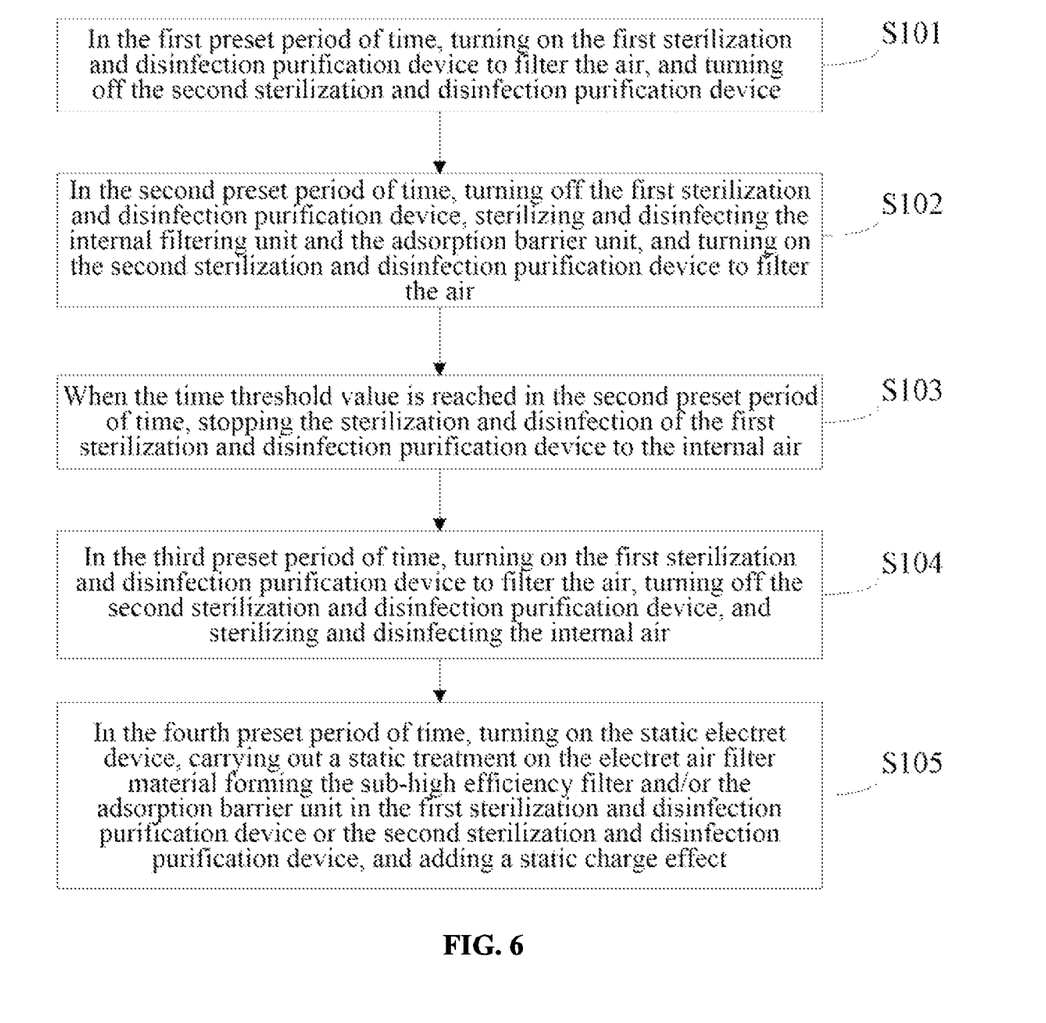
FIG. 6 is a flow diagram of an air purification method for the dynamic filtering and static sterilization and disinfection of a central air conditioner provided by the present disclosure.

FIG. 6 is a flow diagram of an air purification method for the dynamic filtering and static sterilization and disinfection of a central air conditioner provided by the present disclosure. As shown in FIG. 6, the method comprises the following steps:

step S101, turning on the first sterilization and disinfection purification device to filter the air, and turning off the second sterilization and disinfection purification device;

step S102, in the second preset period of time, turning off the first sterilization and disinfection purification device, sterilizing and disinfecting the internal filtering unit and the adsorption barrier unit, and turning on the second sterilization and disinfection purification device to filter the air;

step S103, when the time threshold value is reached in the second preset period of time, stopping the sterilization and disinfection of the first sterilization and disinfection purification device to the internal air;

step S104, in the third preset period of time, turning on the first sterilization and disinfection purification device to filter the air, turning off the second sterilization and disinfection purification device, and sterilizing and disinfecting the internal filtering unit and the adsorption barrier unit; and step S105, in the fourth preset period of time, turning on the static electret device, carrying out a static treatment on the electret air filter material forming the sub-high efficiency filter and the adsorption barrier unit in the first sterilization and disinfection purification device or the second sterilization and disinfection purification device, and adding a static charge effect.

Wherein, the fourth preset period of time coincides with the first preset period of time, the second preset period of time and the third preset period of time.

In the scheme, the air to be purified enters the filtering unit of the system, and the dust particles and particles in the gas and part of bacteria thereof are filtered. The filtered clean air and the air containing a small amount of particles, bacteria and viruses enter the adsorption barrier unit. The adsorption barrier unit composed of materials with good adsorption barrier capacity effectively blocks the bacteria and viruses in the air through filtration, adsorption and blocking, so that cross infection in the activity space of the crowd is prevented. When the system continuously works for the set period of time, the inlet and outlet valves are closed, the other set of standby device is turned on, and then the sterilization and disinfection system is started. According to the requirements for killing the bacteria and viruses, sterilization and disinfection in different time periods are set, and a standby state is entered after killing is completed. In the two sets of devices, one for use and one for standby, the two sets of devices are standby for each other, and dynamic filtration and static sterilization and disinfection are realized. Therefore, the sterilization and disinfection effect is ensured, cross infection is effectively prevented, the system configuration is also optimized, the installed capacity is reduced, and the operating cost is reduced.

The air treated by the system enters an air processor, and exchanges heat with a cooling medium to reduce the temperature, so that the temperature of the air becomes suitable for the indoor space. The air is distributed to a required space through an air supply pipeline by an air supply fan, and is sent into a room through an air supply port of the room, so that the room maintains a certain temperature. Then, the air is exhausted and collected from the room through the return air inlet into a return air pipeline. Part of the air is exhausted into the atmospheric environment through the circulation fan by adjusting an air discharge valve, and the other part passes through the air filters of the dynamic filtration and static sterilization and disinfection device again after being mixed with supplemented fresh air through a return air adjusting valve. Part of dust particles and particles brought in the fresh air of the gas are filtered. The filtered clean air enters the adsorption barrier unit again, and enters an air conditioning processor after the bacteria and viruses are eliminated, so that the circulation of the process is realized.

The air purification system for the dynamic filtering and static sterilization and disinfection of a central air conditioner adopts advanced sterilization and disinfection ideas and ingenious configuration, and the effective sterilization and disinfection system for large-scale air purification systems is realized. No matter the chemical process of ozone sterilization and disinfection or the physical sterilization and disinfection process of ultraviolet and microwave is adopted, the sterilization and disinfection intensity and the residence time are perfectly unified, so that the sterilization and disinfection device is small in scale, the equipment is small in size, the installed power is low, the effective sterilization and disinfection effect is realized by using the most ideal installed power and the most reasonable equipment. The traditional thoughts of existing sterilization concepts are completely overturned. The process is applicable to the air purification system for the dynamic filtering and static sterilization and disinfection of a central air conditioner, and the perfect combination of traditional air purification and sterilization and disinfection is realized.

It should be noted that in the embodiment of the air purification system for the dynamic filtering and static sterilization and disinfection of a central air conditioner, the various units and modules are merely divided according to functional logic, but are not limited to the division, as long as corresponding functions can be achieved. In addition, the specific name of each functional unit is merely to facilitate mutual distinction, and is not intended to limit the scope of protection of the embodiments of the present disclosure.

What is claimed is:

1. An air purification system for the dynamic filtering and static sterilization and disinfection of a central air conditioner, comprising:
   a first sterilization and disinfection purification device;
   a second sterilization and disinfection purification device; and
   an air circulating device,
   the first sterilization and disinfection purification device and the second sterilization and disinfection purification device being configured in parallel, being connected with the air circulating device, and being used for filtering, sterilizing and disinfecting the air,
   wherein the first sterilization and disinfection purification device and the second sterilization and disinfection purification device respectively control, according to different operation procedures, an opening and closing of valves that are respectively configured,
   wherein each of the first sterilization and disinfection purification device and the second sterilization and disinfection purification device comprises a filtering unit, an adsorption barrier unit, a static electret unit, a sterilization and disinfection unit and an internal air circulating unit,
   wherein the filtering unit of each of the first sterilization and disinfection purification device and the second sterilization and disinfection purification device is used for filtering dust and particles in the air, the adsorption barrier unit of each of the first sterilization and disinfection purification device and the second sterilization and disinfection purification device is used for adsorbing bacteria and viruses, the sterilization and disinfection unit of each of the first sterilization and disinfection purification device and the second sterilization and disinfection purification device is used for sterilizing and disinfecting the bacteria and viruses adsorbed by the adsorption barrier unit of each of the first sterilization and disinfection purification device and the second sterilization and disinfection purification device, the air circulating device of each of the first sterilization and disinfection purification device and the second sterilization and disinfection purification device is used for realizing the air circulation of the air purification system for the dynamic filtering and static sterilization and disinfection of a central air conditioner, and the internal air circulating unit of each of the first sterilization and disinfection purification device and the second sterilization and disinfection purification device is used for respectively realizing an internal gas circulation of the first sterilization and disinfection purification device and the second sterilization and disinfection purification device during operational procedures of sterilization and disinfection.

2. The air purification system for the dynamic filtering and static sterilization and disinfection of a central air conditioner according to claim 1, further comprising a control unit, wherein the control unit is used for controlling the opening of the valve of the first sterilization and disinfection purification device in a first preset period of time and controlling the closing of the valve of the first sterilization and disinfection purification device and the opening of the valve of the second sterilization and disinfection purification device in a second preset period of time, wherein the first sterilization and disinfection purification device filters the air in the first preset period of time and sterilizes and disinfects the filtering unit inside the first sterilization and disinfection purification device and the adsorption barrier unit of the first sterilization and disinfection purification device in the second preset period of time, and wherein when a time threshold value is reached in the second preset period of time, the control unit controls the sterilization and disinfection unit in the first sterilization and disinfection purification device to stop sterilization and disinfection.

3. The air purification system for the dynamic filtering and static sterilization and disinfection of a central air conditioner according to claim 2, wherein the filtering unit of each of the first sterilization and disinfection purification device and the second sterilization and disinfection purification device comprises a coarse efficiency filter, a medium efficiency filter and a sub-high efficiency filter which are connected in sequence, and entering gas passes through the coarse efficiency filter, the medium efficiency filter, the sub-high efficiency filter of the filtering unit of each of the first sterilization and disinfection purification device and the second sterilization and disinfection purification device and/or the adsorption barrier unit of each of the first sterilization and disinfection purification device and the second sterilization and disinfection purification device to be filtered.

4. The air purification system for the dynamic filtering and static sterilization and disinfection of a central air conditioner according to claim 3, wherein the adsorption barrier unit of each of the first sterilization and disinfection purification device and the second sterilization and disinfection purification device and/or the sub-high efficiency filter of the filtering unit of each of the first sterilization and disinfection purification device and the second sterilization and disinfection purification device are/is connected with the medium efficiency filter, and the adsorption barrier unit of each of the first sterilization and disinfection purification device and the second sterilization and disinfection purification device and/or a filter layer of the sub-high efficiency filter of the filtering unit of each of the first sterilization and disinfection purification device and the second sterilization and disinfection purification device are/is made of electret melt-blown non-woven fabric and used for adsorbing and blocking the bacteria and viruses in the air on a surface of the adsorption barrier unit of each of the first sterilization and disinfection purification device and the second sterilization and disinfection purification device, among adsorption material particle gaps and in adsorption material micropores.

5. The air purification system for the dynamic filtering and static sterilization and disinfection of a central air conditioner according to claim 3, wherein the static electret unit of each of the first sterilization and disinfection purification device and the second sterilization and disinfection purification device is configured in front of the sub-high efficiency filter of the filtering unit of each of the first sterilization and disinfection purification device and the second sterilization and disinfection purification device and/or the adsorption barrier unit of each of the first sterilization and disinfection purification device and the second sterilization and disinfection purification device and used for carrying out a static treatment on an electret air filter material forming the sub-high efficiency filter of the filtering unit of each of the first sterilization and disinfection purification device and the second sterilization and disinfection purification device and/or the adsorption barrier unit of each of the first sterilization and disinfection purification device and the second sterilization and disinfection purification device and adding a static charge effect to an electret melt-blown fabric filter material forming the sub-high efficiency filter of the filtering unit of each of the first sterilization and disinfection purification device and the second sterilization and disinfection purification device and/or the adsorption barrier unit of each of the first sterilization and disinfection purification device and the second sterilization and disinfection purification device in a timing mode.

6. The air purification system for the dynamic filtering and static sterilization and disinfection of a central air conditioner according to claim 4, wherein the sterilization and disinfection unit of each of the first sterilization and disinfection purification device and the second sterilization and disinfection purification device comprises any one of an ultraviolet sterilization device, an ozone sterilization device and a microwave sterilization device, and is used for sterilizing and disinfecting the bacteria and viruses adsorbed and blocked on the surface of the adsorption barrier unit of each of the first sterilization and disinfection purification device and the second sterilization and disinfection purification device, among the adsorption material particle gaps and in the adsorption material micropores.

7. The air purification system for the dynamic filtering and static sterilization and disinfection of a central air conditioner according to claim 4, wherein the sterilization and disinfection unit of each of the first sterilization and disinfection purification device and the second sterilization and disinfection purification device sterilizes and disinfects the bacteria and viruses in the coarse efficiency filter of the filtering unit of each of the first sterilization and disinfection purification device and the second sterilization and disinfection purification device, the medium efficiency filter of the filtering unit of each of the first sterilization and disinfection purification device and the second sterilization and disinfection purification device, the sub-high efficiency filter of the filtering unit of each of the first sterilization and disinfection purification device and the second sterilization and disinfection purification device and/or the adsorption barrier unit of each of the first sterilization and disinfection purification device and the second sterilization and disinfection purification device respectively.

8. The air purification system for the dynamic filtering and static sterilization and disinfection of a central air conditioner according to claim 1, wherein the air circulating device comprises a clean air adjusting valve, a circulating and adjusting valve, an air exhaust adjusting valve, an air conditioner main unit, an air supply fan, air ducts and a circulation fan, and the air ducts comprise an air supply duct and an air return duct, wherein the first sterilization and disinfection purification device and the second sterilization and disinfection purification device supply clean air into the air conditioner main unit, the air adjusted by the air conditioner main unit is supplied into an indoor space through the air supply duct by the air supply fan, part of the gas in the indoor space is exhausted into an atmosphere through the air return duct by the circulation fan, an other part of the gas in the indoor space is supplied into the first sterilization and disinfection purification device or the second sterilization and disinfection purification device after being mixed with supplemented clean air, the air exhaust adjusting valve is used for controlling a flow of gas exhausted into the atmosphere, the circulating and adjusting valve is used for controlling the flow of circulating gas, and the clean air adjusting valve is used for adjusting the flow of the supplemented clean air.

9. The air purification system for the dynamic filtering and static sterilization and disinfection of a central air conditioner according to claim 3, wherein the internal air circulating unit of each of the first sterilization and disinfection purification device and the second sterilization and disinfection purification device is configured with internal circulation fans, and wherein the internal circulation fans of the internal air circulating unit of each of the first sterilization and disinfection purification device and the second sterilization and disinfection purification device are correspondingly configured on the coarse efficiency filter of the filtering unit of each of the first sterilization and disinfection purification device and the second sterilization and disinfection purification device, the medium efficiency filter of the filtering unit of each of the first sterilization and disinfection purification device and the second sterilization and disinfection purification device, the sub-high efficiency filter of the filtering unit of each of the first sterilization and disinfection purification device and the second sterilization and disinfection purification device and the adsorption barrier unit of each of the first sterilization and disinfection purification device and the second sterilization and disinfection purification device and are used for realizing internal gas circulation of the first sterilization and disinfection purification device and the second sterilization and disinfection purification device.

10. An air purification method for the dynamic filtering and static sterilization and disinfection of a central air conditioner, comprising the following steps:

in a first preset period of time, turning on a first sterilization and disinfection purification device to filter the air, and turning off a second sterilization and disinfection purification device;

in second preset period of time, turning off the first sterilization and disinfection purification device, sterilizing and disinfecting an internal filtering unit and an adsorption barrier unit, and turning on the second sterilization and disinfection purification device to filter the air;

when a time threshold value is reached in the second preset period of time, stopping the sterilization and disinfection of the first sterilization and disinfection purification device to the internal air so that the first sterilization and disinfection purification device is in a standby state;

in the a preset period of time, turning on the first sterilization and disinfection purification device to filter the air, turning off the second sterilization and disinfection purification device, and sterilizing and disinfecting the internal filtering unit and the adsorption barrier unit; and in a fourth preset period of time, turning on a static electret device, carrying out a static treatment on an electric air filter material forming a sub-high efficiency filter and the adsorption barrier unit in the first sterilization and disinfection purification device or the second sterilization and disinfection purification device, and adding a static charge effect so that the electret filter material keeps static; the fourth preset period of time coincides with the first preset period of time, the second preset period of time and the third preset period of time; and the first sterilization and disinfection purification device and the second sterilization and disinfection purification device each comprise a filtering unit, an adsorption barrier unit, a static electret unit, a sterilization and disinfection unit and an internal air circulating unit, the filtering unit is used for filtering dust and particles in the air, the adsorption barrier unit is used for adsorbing bacteria and viruses, the static electret unit is used for carrying out the static treatment on the electret air filter material and adding the static charge effect, the sterilization and disinfection unit is used for sterilizing and disinfecting the bacteria and viruses adsorbed by the adsorption barrier unit, and the internal air circulating unit is used for respectively realizing an internal gas circulation of the first sterilization and disinfection purification device and the second sterilization and disinfection purification device during operational procedures of sterilization and disinfection.

11. The air purification system for the dynamic filtering and static sterilization and disinfection of a central air conditioner according to claim 2, wherein the air circulating device comprises a clean air adjusting valve, a circulating and adjusting valve, an air exhaust adjusting valve, an air conditioner main unit, an air supply fan, air ducts and a circulation fan, and the air ducts comprise an air supply duct and an air return duct, wherein the first sterilization and disinfection purification device and the second sterilization and disinfection purification device supply clean air into the air conditioner main unit, the air adjusted by the air conditioner main unit is supplied into an indoor space through the air supply duct by the air supply fan, part of the gas in the indoor space is exhausted into an atmosphere through the air return duct by the circulation fan, an other part of the gas in the indoor space is supplied into the first sterilization and disinfection purification device or the second sterilization and disinfection purification device after being mixed with supplemented clean air, the air exhaust adjusting valve is used for controlling a flow of gas exhausted into the atmosphere, the circulating and adjusting valve is used for controlling the flow of circulating gas, and the clean air adjusting valve is used for adjusting the flow of the supplemented clean air.

12. The air purification system for the dynamic filtering and static sterilization and disinfection of a central air conditioner according to claim 3, wherein the air circulating device comprises a clean air adjusting valve, a circulating and adjusting valve, an air exhaust adjusting valve, an air conditioner main unit, an air supply fan, air ducts and a circulation fan, and the air ducts comprise an air supply duct and an air return duct, wherein the first sterilization and disinfection purification device and the second sterilization and disinfection purification device supply clean air into the air conditioner main unit, the air adjusted by the air conditioner main unit is supplied into an indoor space through the air supply duct by the air supply fan, part of the gas in the indoor space is exhausted into an atmosphere through the air return duct by the circulation fan, an other part of the gas in the indoor space is supplied into the first sterilization and disinfection purification device or the second sterilization and disinfection purification device after being mixed with supplemented clean air, the air exhaust adjusting valve is used for controlling a flow of gas exhausted into the atmosphere, the circulating and adjusting valve is used for controlling the flow of circulating gas, and the clean air adjusting valve is used for adjusting the flow of the supplemented clean air.

13. The air purification system for the dynamic filtering and static sterilization and disinfection of a central air conditioner according to claim 4, wherein the air circulating device comprises a clean air adjusting valve, a circulating and adjusting valve, an air exhaust adjusting valve, an air conditioner main unit, an air supply fan, air ducts and a circulation fan, and the air ducts comprise an air supply duct and an air return duct, wherein the first sterilization and disinfection purification device and the second sterilization and disinfection purification device supply clean air into the air conditioner main unit, the air adjusted by the air conditioner main unit is supplied into an indoor space through the air supply duct by the air supply fan, part of the gas in the indoor space is exhausted into an atmosphere through the air return duct by the circulation fan, an other part of the gas in the indoor space is supplied into the first sterilization and disinfection purification device or the second sterilization and disinfection purification device after being mixed with supplemented clean air, the air exhaust adjusting valve is used for controlling a flow of gas exhausted into the atmosphere, the circulating and adjusting valve is used for controlling the flow of circulating gas, and the clean air adjusting valve is used for adjusting the flow of the supplemented clean air.

14. The air purification system for the dynamic filtering and static sterilization and disinfection of a central air conditioner according to claim 5, wherein the air circulating device comprises a clean air adjusting valve, a circulating and adjusting valve, an air exhaust adjusting valve, an air conditioner main unit, an air supply fan, air ducts and a circulation fan, and the air ducts comprise an air supply duct and an air return duct, wherein the first sterilization and disinfection purification device and the second sterilization and disinfection purification device supply clean air into the air conditioner main unit, the air adjusted by the air conditioner main unit is supplied into an indoor space through the air supply duct by the air supply fan, part of the gas in the indoor space is exhausted into an atmosphere through the air return duct by the circulation fan, an other part of the gas in the indoor space is supplied into the first sterilization and disinfection purification device or the second sterilization and disinfection purification device after being mixed with supplemented clean air, the air exhaust adjusting valve is used for controlling a flow of gas exhausted into the atmosphere, the circulating and adjusting valve is used for controlling the flow of circulating gas, and the clean air adjusting valve is used for adjusting the flow of the supplemented clean air.

15. The air purification system for the dynamic filtering and static sterilization and disinfection of a central air conditioner according to claim 6, wherein the air circulating device comprises a clean air adjusting valve, a circulating and adjusting valve, an air exhaust adjusting valve, an air conditioner main unit, an air supply fan, air ducts and a circulation fan, and the air ducts comprise an air supply duct and an air return duct, wherein the first sterilization and disinfection purification device and the second sterilization and disinfection purification device supply clean air into the air conditioner main unit, the air adjusted by the air conditioner main unit is supplied into an indoor space through the air supply duct by the air supply fan, part of the gas in the indoor space is exhausted into an atmosphere through the air return duct by the circulation fan, an other part of the gas in the indoor space is supplied into the first sterilization and disinfection purification device or the second sterilization and disinfection purification device after being mixed with supplemented clean air, the air exhaust adjusting valve is used for controlling a flow of gas exhausted into the atmosphere, the circulating and adjusting valve is used for controlling the flow of circulating gas, and the clean air adjusting valve is used for adjusting the flow of the supplemented clean air.

16. The air purification system for the dynamic filtering and static sterilization and disinfection of a central air conditioner according to claim 7, wherein the air circulating device comprises a clean air adjusting valve, a circulating and adjusting valve, an air exhaust adjusting valve, an air conditioner main unit, an air supply fan, air ducts and a circulation fan, and the air ducts comprise an air supply duct and an air return duct, wherein the first sterilization and disinfection purification device and the second sterilization and disinfection purification device supply clean air into the air conditioner main unit, the air adjusted by the air conditioner main unit is supplied into an indoor space through the air supply duct by the air supply fan, part of the gas in the indoor space is exhausted into an atmosphere through the air return duct by the circulation fan, an other part of the gas in the indoor space is supplied into the first sterilization and disinfection purification device or the second sterilization and disinfection purification device after being mixed with supplemented clean air, the air exhaust adjusting valve is used for controlling a flow of gas exhausted into the atmosphere, the circulating and adjusting valve is used for controlling the flow of circulating gas, and the clean air adjusting valve is used for adjusting the flow of the supplemented clean air.

17. The air purification system for the dynamic filtering and static sterilization and disinfection of a central air conditioner according to claim 4, wherein the internal air circulating unit of each of the first sterilization and disinfection purification device and the second sterilization and disinfection purification device is configured with internal circulation fans, and the internal circulation fans of the internal air circulating unit of each of the first sterilization and disinfection purification device and the second sterilization and disinfection purification device are correspondingly configured on the coarse efficiency filter of the filtering unit of each of the first sterilization and disinfection purification device and the second sterilization and disinfection purification device, the medium efficiency filter of the filtering unit of each of the first sterilization and disinfection purification device and the second sterilization and disinfection purification device, the sub-high efficiency filter of the filtering unit of each of the first sterilization and disinfection purification device and the second sterilization and disinfection purification device and the adsorption barrier unit of each of the first sterilization and disinfection purification device and the second sterilization and disinfection purification device and are used for realizing internal gas circulation of the first sterilization and disinfection purification device and the second sterilization and disinfection purification device.

18. The air purification system for the dynamic filtering and static sterilization and disinfection of a central air conditioner according to claim 5, wherein the internal air circulating unit of each of the first sterilization and disinfection purification device and the second sterilization and disinfection purification device is configured with internal circulation fans, and the internal circulation fans of the internal air circulating unit of each of the first sterilization and disinfection purification device and the second sterilization and disinfection purification device are correspondingly configured on the coarse efficiency filter of the filtering unit of each of the first sterilization and disinfection purification device and the second sterilization and disinfection purification device, the medium efficiency filter of the filtering unit of each of the first sterilization and disinfection purification device and the second sterilization and disinfection purification device, the sub-high efficiency filter of the filtering unit of each of the first sterilization and disinfection purification device and the second sterilization and disinfection purification device and the adsorption barrier unit of each of the first sterilization and disinfection purification device and the second sterilization and disinfection purification device and are used for realizing internal gas circulation of the first sterilization and disinfection purification device and the second sterilization and disinfection purification device.

19. The air purification system for the dynamic filtering and static sterilization and disinfection of a central air conditioner according to claim 6, wherein the internal air circulating unit of each of the first sterilization and disinfection purification device and the second sterilization and disinfection purification device is configured with internal circulation fans, and the internal circulation fans of the internal air circulating unit of each of the first sterilization and disinfection purification device and the second sterilization and disinfection purification device are correspondingly configured on the coarse efficiency filter of the filtering unit of each of the first sterilization and disinfection purification device and the second sterilization and disinfection purification device, the medium efficiency filter of the filtering unit of each of the first sterilization and disinfection purification device and the second sterilization and disinfection purification device, the sub-high efficiency filter of the filtering unit of each of the first sterilization and disinfection purification device and the second sterilization and disinfection purification device and the adsorption barrier unit of each of the first sterilization and disinfection purification device and the second sterilization and disinfection purification device and are used for realizing internal gas circulation of the first sterilization and disinfection purification device and the second sterilization and disinfection purification device.

20. The air purification system for the dynamic filtering and static sterilization and disinfection of a central air conditioner according to claim 7, wherein the internal air circulating unit of each of the first sterilization and disinfection purification device and the second sterilization and disinfection purification device is configured with internal circulation fans, and the internal circulation fans of the internal air circulating unit of each of the first sterilization and disinfection purification device and the second sterilization and disinfection purification device are correspondingly configured on the coarse efficiency filter of the filtering unit of each of the first sterilization and disinfection purification device and the second sterilization and disinfection purification device, the medium efficiency filter of the filtering unit of each of the first sterilization and disinfection purification device and the second sterilization and disinfection purification device, the sub-high efficiency filter of the filtering unit of each of the first sterilization and disinfection purification device and the second sterilization and disinfection purification device and the adsorption barrier unit of each of the first sterilization and disinfection purification device and the second sterilization and disinfection purification device and are used for realizing internal gas circulation of the first sterilization and disinfection purification device and the second sterilization and disinfection purification device.

* * * * *